April 2, 1968 W. L. RUMPLE 3,376,395

DEVICE FOR ADJUSTING THE ANGULAR RELATIONSHIP BETWEEN A ROTATING HEAD AND TAPE IN A HELICAL SCAN RECORDER

Filed Jan. 13, 1964 4 Sheets-Sheet 1

INVENTOR.

Wilburn L. Rumple

BY Townsend and Townsend attorneys

April 2, 1968 W. L. RUMPLE 3,376,395

DEVICE FOR ADJUSTING THE ANGULAR RELATIONSHIP BETWEEN A ROTATING HEAD AND TAPE IN A HELICAL SCAN RECORDER

Filed Jan. 13, 1964 4 Sheets-Sheet 2

INVENTOR.

Wilburn L. Rumple

BY

Townsend and Townsend

Attorneys

April 2, 1968 W. L. RUMPLE 3,376,395

DEVICE FOR ADJUSTING THE ANGULAR RELATIONSHIP BETWEEN A ROTATING HEAD AND TAPE IN A HELICAL SCAN RECORDER

Filed Jan. 13, 1964 4 Sheets-Sheet 3

INVENTOR.

Wilburn L. Rumple

BY Townsend and Townsend

Attorneys

INVENTOR.
Wilburn L. Rumple
BY
Townsend and Townsend
attorneys

United States Patent Office 3,376,395
Patented Apr. 2, 1968

3,376,395
DEVICE FOR ADJUSTING THE ANGULAR RELATIONSHIP BETWEEN A ROTATING HEAD AND TAPE IN A HELICAL SCAN RECORDER
Wilburn L. Rumple, Palo Alto, Calif., assignor to Precision Instrument Company, Palo Alto, Calif.
Filed Jan. 13, 1964, Ser. No. 337,447
6 Claims. (Cl. 179—100.2)

ABSTRACT OF THE DISCLOSURE

A magnetic recorder in which two spaced drum-like members are arranged to guide tape obliquely across a gap between the two drums. A rotating transducer scans the space between the two drums to record and play back information on the tape which spans the gap in which guides are mounted on the drums to position the tape at a predetermined oblique angle and which further provides a device for varying the angle between the drums so that the tape angle with respect to the gap between the drums can be controllably varied.

This invention relates to a method and means for aligning magnetic tape with respect to a rotating transducer to correct for the difference between angle of transducer scan on a moving tape and angle of transducer scan on a static tape.

In many magnetic recorders and particularly those used in video recording, the tape passes obliquely or diagonally past a rotating transducer so that the recorded track on the tape runs at an oblique angle on the tape. In such devices the transducers normally travel at a high rate of speed in order to obtain the requisite relative transducer to tape speed or velocity necessary to acquire the high frequency responses necessary in video recording. In such systems the tape is arranged to travel in a helix over a portion of a drum-like guide in which the transducers are mounted on rotating wheels in the center of the drum and move in a direction opposite to the direction of movement of the tape. By this means the recording track created on the tape runs obliquely from one side of the tape along the length to the opposite side, thus allowing, for example, as much as 8 to 12 inches of track length on a 1 inch tape. The scans are parallel to each other and in registration so that an apparently continuous recording signal is obtained sequentially from track to track. It is often desirable in such video recorders to examine or view a single field or frame. This can easily be accomplished in the aforesaid type of system due to the fact that the transducer is rotating at sufficient velocity to read the information on the tape without the necessity of tape movement. However, the recorded tracks are recorded at an angle which is the vector sum of the tape velocity and transducer velocity. When the tape is in a static condition the relative angle of movement of the transducer is different than the recorded track on the tape. This in practice will cause the transducer to scan several tracks and produce a video signal comprising a composite of two or more fields.

It is the principal object of this invention to provide a simple and convenient means for changing the alignment of tape during intervals when the tape is static to allow a single field to be observed.

Another object of this invention is to realign tape wound about a tape guide drum in a helical configuration by shifting the position of a portion of the drum and upper eape guides so that the tape will by its own tension conform to a position wherein the direction of the recorded tracks on the tape will be aligned with the direction of movement of the transducers.

Another object of this invention is to provide a drum assembly for receiving and guiding tape in a helical path around a portion of the drum in which means are provided to urge one end of the two-piece drum apart to cause guide numbers mounted on one of the drum portions to be displaced when said biasing pressure is allowed to be utilized.

A feature and advantage of this invention lies in the fact that a set screw can be conveniently employed to cause the actuation or deactuation of the spring urging the two assemblies apart. Thus, a simple tightening or loosening of the screw can effect the bi-positioning of the drum assembly for both dynamic and static tape reads.

The foregoing objects, features and advantages as well as others will be apparent from reading the following specification and attached drawing in which.

Figure 1:
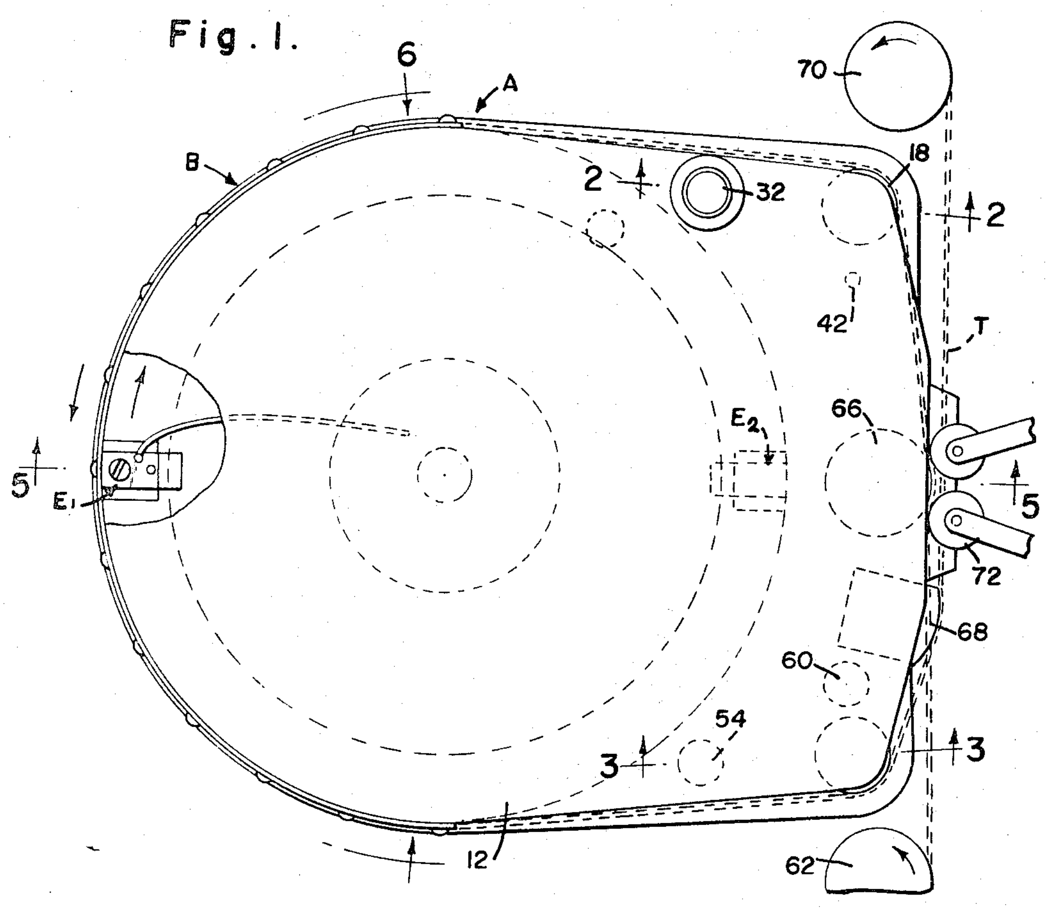
FIGURE 1 is a top plan view of a magnetic tape scanner constructed according to the present invention.
Figure 2:
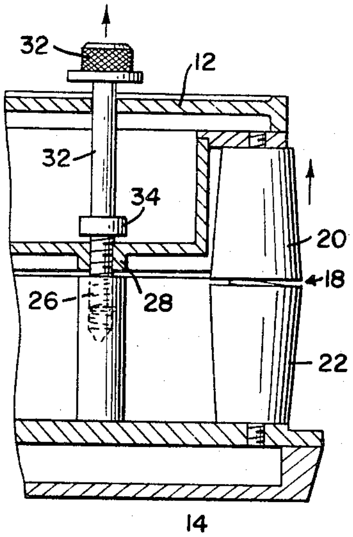
FIGURE 2 is a cross-sectional view taken along line 2—2 of FIG. 1 and showing the drum assembly in an expanded position wherein the tape is aligned for single scan viewing.
Figure 3:
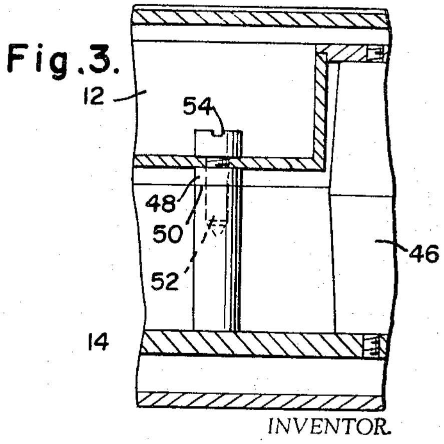
FIGURE 3 is a view in cross-section taken substantially along line 3—3 of FIG. 1 and shows the means for conjoining the opposite corners of the drum segments.
Figure 4:
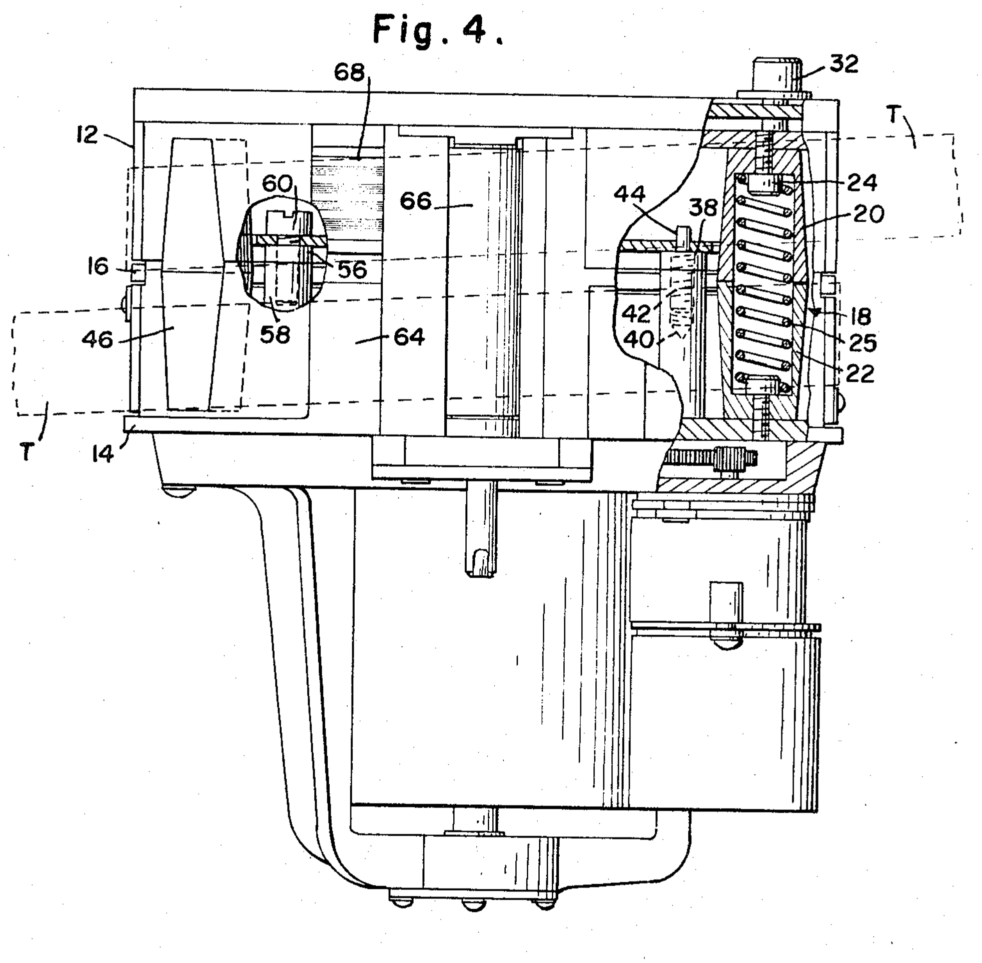
FIGURE 4 is a right side elevational view of the apparatus of FIG. 1 having portions thereof broken away to reveal interior details of the apparatus.
Figure 5:
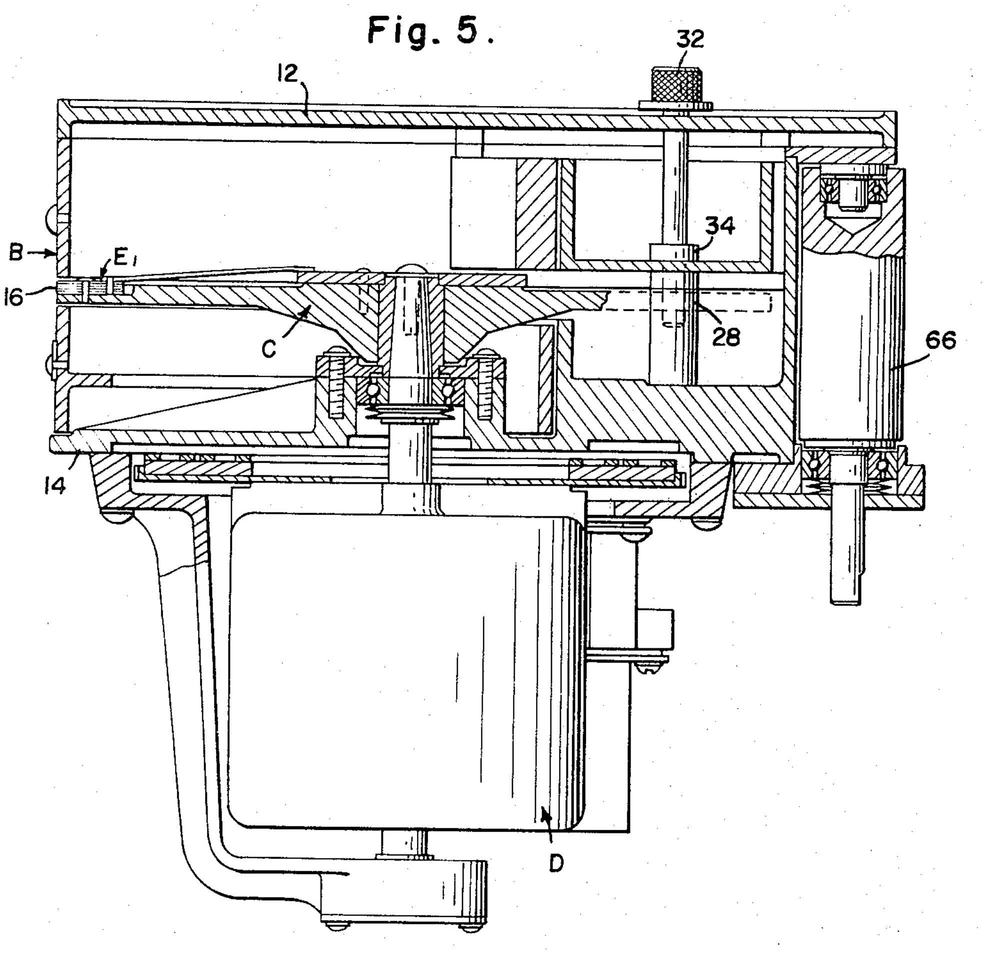
FIGURE 5 is a cross-sectional view of the apparatus taken substantially along line 5—5 of FIG. 1.
Figure 6:
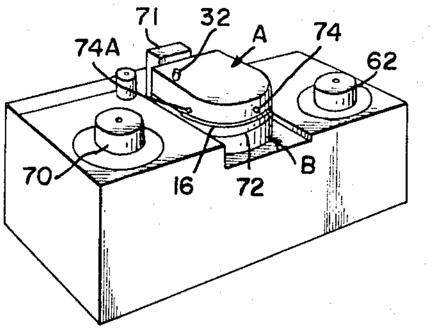
FIGURE 6 is a perspective of a tape recorder having the present invention incorporated therein.

A video tape recorder in which the present invention finds particular application is shown in FIGURE 6, and includes scanning apparatus contained in a housing A which has an arcuate surface B over which magnetic tape is obliquely conveyed from the supply reel 62 to a take-up reel 70. The scanning apparatus of the present invention includes a housing A which defines an arcuate surface B for supporting magnetic tape T in proper angular and spacial relation to a scanning wheel C. Scanning wheel C is driven by a motor D and has a pair of transducer heads $E_1$ and $E_2$ mounted thereon in diametrical opposition.

Figure 7:
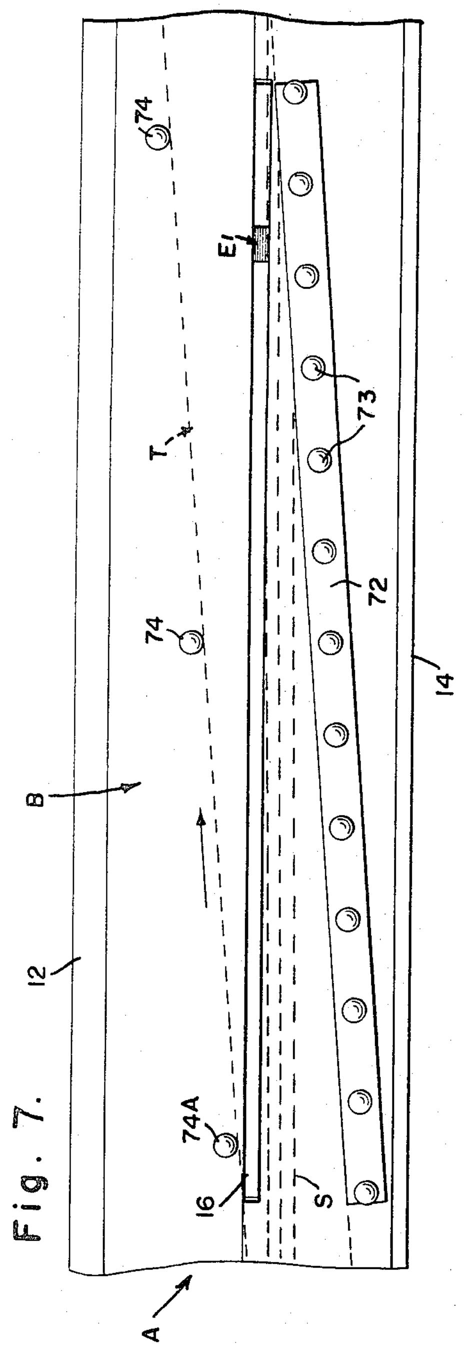
FIGURE 7 is an expanded view of the tape guiding surface and is taken substantially along curved sectional line 7—7 of FIG. 1.

Referring to FIG. 7 tape T traverses the path of transducers $E_1$ and $E_2$ obliquely, as a consequence of which information is stored on tape T in an oblique path. In a typical embodiment of the present invention, tape T travels toward the right as viewed in FIG. 7 at a rate of approximately seven and a half inches per second, and transducer head $E_1$ moves to the left as viewed in the figure at a rate of approximately 620" per second. Thus, the path actually traversed by the transducer heads is the vector sum of the two direction movements and is indicated by a plurality of broken lines S, FIGURE 7.

When tape T is stopped, the vector component contributed by the movement of the tape across arcuate surface B is no longer active, as the consequence of which transducer heads $E_1$ and $E_2$ scan two or more adjacent scan tracks S and a garbled picture is produced. The present invention remedies this condition by altering the angle of the tape to restore scan tracks S to parallelism with the path of travel of transducer $E_1$ and $E_2$.

Housing A is formed of an upper segment 12 and a lower segment 14 each of which are formed in a generally D-shaped configuration so as to form arcuate surface B. Segments 12 are excised for approximately 180° in arcuate surface B to define a slot 16 which enables transducer heads $E_1$ and $E_2$ to magnetically interact with tape on the arcuate surface. Remote from arcuate surface B adjacent one corner of segments 12 and 14 is a tape input guide 18 which is formed of two generally frusto-conical members 20 and 22, which members are affixed to segments 12 and 14, respectively, by screws or the like 24. A guide so shaped will urge tape passing thereover toward the center of the guide. Members 20 and 22 are hollow and house a compression spring 25 which urges the members, and the segments to which they are respectively affixed, away from one another.

Spaced somewhat inwardly from tape input guide 18 segment 12 is formed with a boss 26; segment 14 is formed with an opposing boss 28. I prefer to line bore bosses 26 and 28 to form holes therein that are precisely aligned relative one another and the segments. The hole in lower boss 28 is threaded at 30 to engage a locking screw 32 therein, the hole in upper boss 26 being enlarged to accommodate threads 30 therethrough. Locking screw 32 is formed with a shoulder 34 thereon which urges bosses 26 and 28 into intimate contact so as to properly position the segments relative one to another.

On the side of tape input guide 18 opposite from locking screw 32 segments 12 and 14 are formed respectively with opposed bosses 36 and 38, which bosses are line bored to form an alignment hole in each. The hole in boss 38 is threaded at 40 for receiving a stud 42 therein, the upper portion 44 of which is sized to enter the hole in upper boss 36 so as to align the two bosses.

On the opposite corner of housing A is a tape output guide 46 formed substantially identical to tape input guide 18. Adjacent tape guide 46, segments 12 and 14 are provided respectively with opposing bosses 48 and 50, the bosses being line bored for alignment purposes. The hole in boss 50 is threaded at 52 for receiving a bolt 54 which serves to fixedly secure the bosses in intimate contact thereby to space and align segments 12 and 14 relative one another.

On the side of tape output guide 46 opposite from bolt 54 are upper and lower bosses 56 and 58. The bosses are line bored and the lower boss 58 is threaded to receive a bolt 60 for fixedly securing the bosses together, thereby aiding in the alignment of segments 12 and 14.

When moving tape is to be scanned, bolt 32 is threaded into threads 30 in boss 28 to cause shoulder 34 to urge bosses 26 and 28 into intimate contact. Tape from a supply reel, indicated schematically at 62, is fed into the scanning apparatus over an erase head 64 and a continuously running capstan 66 to tape input guide 18. From input guide 18 the tape is guided around arcuate surface B in a helical or spiral path to contact the upper portion of tape output guide 46, from which guide the tape traverses an audio head 68 and capstan 66 to a take-up reel, indicated schematically at 70. Retractable pinch rolls 71 are provided adjacent to capstan 66 and are moveable toward and away from the capstan by conventional means not shown for controllably starting or stopping movement of tape T through the scanner.

Referring again to FIG. 7 a lower tape guide 72 is affixed by rivets or the like 73 to the arcuate surface of segment 14. Tape guide 72 engages the lower lateral edge of tape T and guides the tape obliquely relative to slot 16 and the path of travel of transducer heads $E_1$ and $E_2$. Guide 72 has its greatest affect adjacent to the output end of the arcuate surface (the right side as viewed in FIG. 7) since the guide resists the tendency, caused by tape output guide 46, of the tape to move centrally of arcuate surface B. On the arcuate surface of segment 12 are three upper tape guide protuberances 74 which engage the upper lateral edge of tape T to assist in guiding the tape over arcuate surface B obliquely relative to the direction of movement of the transducers. Guide 74A, adjacent the input end of arcuate surface B (the left side as viewed in FIG. 7), has the greatest effect in so guiding the tape since it restrains tape T against the tendency, caused by tape input guide 18 to move centrally of the arcuate surface.

In one scanning apparatus constructed according to the present invention tape guides 72 and 74 where positioned to guide a 1" tape over arcuate surface B at an angle of approximately 4.5° with respect to the plane of disc C. In such apparatus the length of tape scans S is approximately 10.5".

Figure 8:
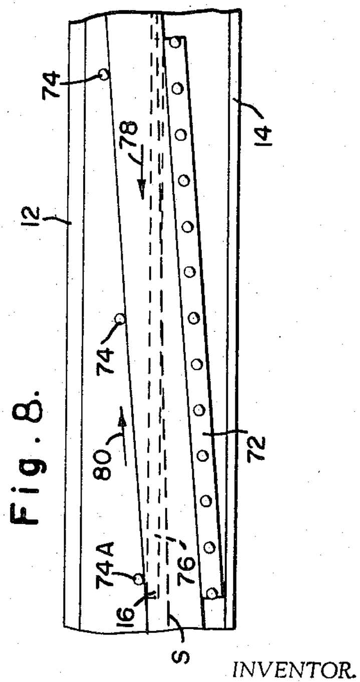
FIGURE 8 is a schematic view of tape orientation during tape movement and in which certain of the dimensions and angles are exaggerated for clarity.

Referring now to FIG. 8, a schematic diagram of arcuate surface B during tape movement thereon, a solid line 76 designates the path of travel of transducer heads $E_1$ and $E_2$, arrow 78 indicating the direction of such travel. Tape T travels in a generally opposite direction indicated at arrow 80. Vector addition of the velocities indicated by arrows 78 and 80 causes the transducer heads to scan tape scan track S, as a consequence of which a single scan is traversed each time one of transducer heads $E_1$ or $E_2$ passes tape T.

Figure 9:
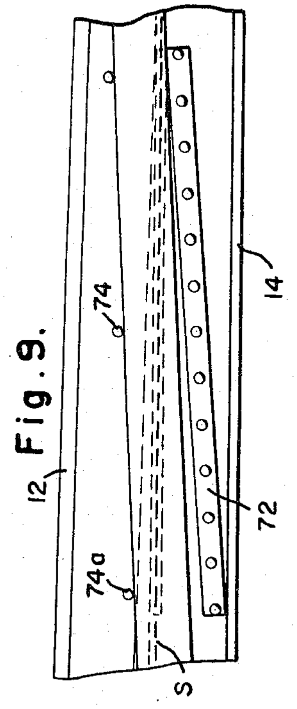
FIGURE 9 is a schematic view of the tape orientation in a static condition in which certain angles and dimensions are exaggerated for clarity.

When tape T is stopped by retracting pinch rolls 71 from capstan 66 the influence of longitudinal tape movement, designated by arrow 80, is removed as a consequence of which the path over which transducer heads $E_1$ and $E_2$ travers tape T is coincident with the path of travel 76 of the transducers. As a result of such condition the transducer heads traverse two or more scan lines S each time one of them passes tape T. Compensation for such condition is effected in the present invention by loosening locking screw 32 so as to raise shoulder 34 and permit compression spring 25 to raise segment 12 with respect to segment 14. The upper and lower segments are maintained in alignment by alignment projection 44 on stud 42 and by bolts 54 and 60 on the opposite corner of housing A. The raising of segment 12 adjacent the tape input end causes upper tape guide protuberance 74 to raise. Since tape T is tensioned and since tape input guide 18 urges tape T centrally of arcuate surface B, the tape will move upward and against protuberance 74A to a new angular position, indicated schematically in FIG. 9. It will be seen that scan tracks S are parallel to the path of travel of transducer heads $E_1$ and $E_2$ as a consequence of which only one scan will be traversed each time transducer heads $E_1$ or $E_2$ pass the tape. One need simply manually advance the tape over arcuate surface B to select the scan S that is desired for monitoring.

When dynamic operation is again desired locking screw 32 is tightened to bring the bosses 26 and 28 into engagement. Such action restores segment 12 to the original position and guides tape T at the proper angle with respect to the transducer heads.

In one scanning apparatus constructed according to my invention tape guides 18 and 46 were spaced from one another by approximately 5½" and stud 42 was spaced from bolt 60 by a distance of approximately 3¼". In the exemplary apparatus segments 12 and 14 were constructed of cast aluminum. It was found that on loosening locking screw 32, frusto-conical members 20 and 22 of tape input guide 18 separated from one another by approximately .010" and the angle between path of travel 76 of transducer heads $E_1$ and $E_2$ changed from 4.520° with respect to the longitudinal axis of the tape to 4.575°. The latter angle is correct in the referenced exemplary apparatus for scanning a single scan track S.

Thus, I have provided an extremely simple device for permitting magnetic tape to be scanned in a stopped or static condition without developing a garbled picture signal. The extreme simplicity of the present invention fosters rapid adjustment of the device between static and dynamic modes of operation.

While one embodiment of my invention has been shown and described it will be apparent that other adaptations and modifications may be made without departing from the true spirit and scope of the invention.

What is claimed is:

1. In a tape recorder of the type having an arcuate tape guide assembly formed of a drum having two half segments, means holding said segments in spaced apart relation, a scanning disc in the space between said segments, said scanning disc carrying magnetic transducers, and magnetic tape drive and guide means to guide tape to travel in a helical path about a portion of the peripheral surface of said drum at a position to allow the transducers to scan the tape obliquely, the improvement comprising guide means mounted on the arcuate surface of one of the two segments to guide said tape across the arcuate surface of said helical path, means moving one portion of one of the two segments of said drum away from the other of the two segments while maintaining another portion of the first one of the segments in a fixed relation relative to the other of said segments.

2. In a magnetic recorder comprising: a tape guide formed of two cylindrical members mounted in closely spaced, substantially axial alignment with their facing ends being of substantially the same outside diameter, a transducer mounted for movement between the two facing ends of the cylindrical members in a fixed path substantially coincident with the outer diameter of the facing ends of said cylindrical members, a tape guide mounted on at least one of said cylindrical members for guiding tape for movement across both drums at a predetermined oblique angle across the space between said facing ends, and means for adjustably changing the angle between said two cylindrical members with respect to each other to cause said guide to change the angle of the tape with respect to the fixed path of movement of said transducer.

3. In a magnetic recorder of the type having a drum assembly carrying a means for rotating a transducer within said drum assembly so that the transducer traverses a portion of the peripheral surface of said drum, means guiding tape across said drum at an angular relationship whereat said transducer traverses said tape obliquely of the longitudinal axis of the tape, first guide means mounted on said drum adjacent the input end of tape on said drum, second guide means mounted on said drum adjacent the output end of said tape, said first and second guide means guiding said tape against upward movement, means to move said first guide means from a first position to an upper second position while retaining said second guide means in a substantially fixed position, means for tensioning said tape to cause said tape to engage first and second guide means when in said first and said second positions, whereby the angle of said tape relative to said transducer scan path changes when said first guide means is moved to said first and second positions, means driving said tape, and means to disengage said tape driving means while maintaining tape tension while said first guide means is in said second position.

4. In a magnetic tape scanning device of the type having a transducer head, means for moving the head along a circular path, a housing having first and second segments defining an arcuate surface coaxial with the circular head path, said segments being spaced apart to define a slot to accommodate said head therebetween, and guides on said segments defining a tape channel on said arcuate surface that is obliquely oriented relative to the circular path of said transducer head; means for decreasing the angle between said tape channel and said circular path to permit single scan viewing of the tape comprising: means resiliently urging said segments apart at one end of said arcuate surface, means for releasably securing said segments together against said urging means, and means fixedly securing said segments together at a site proximate the other end of said arcuate surface.

5. Magnetic tape scanning apparatus of the type having at least one tape scanning transducer carried in a circular path comprising first and second D-shaped segments defining an arcuate tape supporting surface concentric with the transducer circular path, said segments being excised to define a slot on said circular transducer path for approximately 180° thereof, said D-shaped segments having a pair of corners remote from said arcuate surface, a tape input guide at one corner of said housing for urging the tape centrally of said arcuate surface, a tape output guide at the other corner of said housing for urging the tape centrally of said arcuate surface, a protuberance mounted on said first segment on said arcuate surface adjacent said input guide for engaging one lateral edge of the tape to retain the tape in contact with said second segment adjacent the input side of said arcuate surface, a guide on said second segment on said arcuate surface adjacent said output guide for engaging the opposite lateral edge of the tape to retain the tape in contact with said first segment adjacent the output side of said arcuate surface so as to direct the tape obliquely of said slot, means for fixedly securing said segments together proximate said output guide, means for releasably securing said segments together proximate said input guide, and means for resiliently biasing said segments apart adjacent said input guide in response to release of said releasable securing means thereby to move said protuberance away from said slot so as to direct the tape over said arcuate surface at an angle less oblique to said slot.

6. The invention of claim 5 wherein said input guide comprises first and second hollow frusto-conical members secured to respective segments and wherein said resilient biasing means comprises a compression spring disposed within said hollow frusto-conical members.

References Cited

UNITED STATES PATENTS

| | | | |
|---|---|---|---|
| 2,919,314 | 12/1959 | Holt | 179—100.2 |
| 3,095,473 | 6/1963 | Roizen | 179—100.2 |

FOREIGN PATENTS

| | | |
|---|---|---|
| 833,278 | 4/1960 | Great Britain. |
| 927,999 | 5/1955 | Germany. |

TERRELL W. FEARS, *Primary Examiner.*

BERNARD KONICK, *Examiner.*

R. J. GOUDEAU, *Assistant Examiner.*